July 28, 1942.　　　T. C. LENNOX　　　2,291,340
ELECTRICAL SWITCHING SYSTEM
Filed May 10, 1941
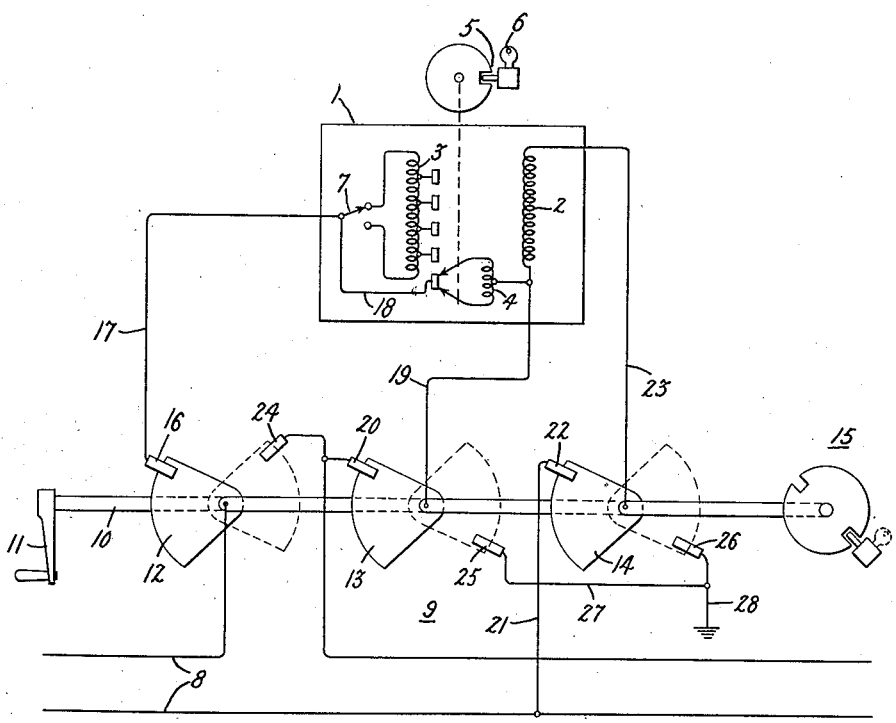
Inventor:
Thomas C. Lennox,
by Harry E. Dunham
His Attorney.

Patented July 28, 1942

2,291,340

UNITED STATES PATENT OFFICE 2,291,340

ELECTRICAL SWITCHING SYSTEM

Thomas C. Lennox, Pittsfield, Mass., assignor to General Electric Company, a corporation of New York Application May 10, 1941, Serial No. 392,915

8 Claims. (Cl. 171—119)

This invention relates to electrical switching systems and more particularly to an improved switching system for autotransformer-type alternating-current voltage regulators.

In autotransformer-type voltage regulators, such as induction voltage regulators and step feeder voltage regulators, the primary winding of the autotransformer is usually the common winding and is connected across the circuit whose voltage is to be regulated. The remaining part of the autotransformer winding is connected in series in the circuit whose voltage is to be regulated, on either the source or the load side of the shunt winding. This so-called series winding, together with the common winding, comprises the secondary winding of the autotransformer. In operation the series winding inserts a variable regulating voltage in the regulated circuit, this being accomplished by rotating the windings relative to each other in the induction type regulator so as to vary their coupling and by changing taps in the series winding in the step type regulator.

It is usually desirable to be able to connect such a regulator to its circuit without interrupting the current therein and to be able to disconnect the regulator from its circuit without interrupting the current therein but this cannot be done indiscriminately for a number of reasons. For instance, if the series winding is connected in parallel with a portion of one of the conductors of the circuit and that conductor is then open, the current in the circuit will not be interrupted but excessive voltages will be produced across the shunt winding because such regulators are usually designed to produce a maximum regulating voltage of about ±10% of the circuit voltage so that when the series winding is connected to carry the circuit current and the shunt winding is open circuited the voltage across the shunt winding will be ten times the voltage across the series winding. If in order to get around this difficulty the shunt winding is first connected across the circuit, then the paralleling of the series winding with a portion of a conductor of the circuit, which in effect short circuits the series winding, will result in an injuriously high current flow through the series winding. Similarly, when it is attempted to disconnect such a regulator from its circuit, by-passing of the series winding preliminary to opening its circuit will result in injuriously high short circuit currents therein while initial open circuiting of the shunt winding circuit before the series winding is removed from service will result in dangerously high shunt winding voltages.

In accordance with this invention there is provided a novel and simple switching system for removing an autotransformer-type voltage regulator from its circuit and reconnecting it thereto which is characterized by an interlock between the regulator and the switching means so that the switching operation can only take place when the regulator is in its neutral position. By "neutral position" is meant the position in which the regulator is neither bucking nor boosting the voltage of its circuit. This switching system is further characterized by the provision of means for short circuit and grounding the windings of the disconnected regulator so as to protect workmen who may be called upon to repair or adjust the regulator after it has been taken out of service.

An object of the invention is to provide a new and improved regulator switching system.

Another object of the invention is to provide a switching system which can connect and disconnect an autotransformer-type voltage regulator from its circuit without interrupting the current in its circuit and which when the regulator is disconnected serves to short circuit at least the shunt winding of the regulator and ground both windings so as to prevent injury to workmen or others who may come in contact with the regulator or its parts after it has been disconnected from its circuit.

The invention will be better understood from the following description taken in connection with the accompanying drawing and its scope will be pointed out in the appended claims.

Referring now to the single figure of the accompanying drawing, there is shown therein diagrammatically an embodiment of the invention applied to a single-phase step regulator 1 having a shunt winding 2 and a tapped series winding 3. The tap-changing means is shown by way of example as of the conventional double finger type which makes use of a mid-tapped reactor 4. This tap-changing means may be operated so as to make successive contact with the various taps by means of any suitable driving mechanism, the details of which form no part of the present invention. However, attached to this driving mechanism is a lock 5 provided with a key 6 whereby the tap-changing mechanism may be locked in its neutral position, which is the position in which it has been illustrated. In this position the tap-changing means engages an end tap which is connected to the common terminal of a reversing switch 7. The function of the reversing switch is to change the connections or polarity of the series winding when the regulator goes from buck to boost or vice versa.

The regulator serves to regulate the voltage of an alternating-current circuit 8 and the master switching means for controlling its connection to and disconnection from the circuit 8 without interrupting the current flow in this circuit is shown generally at 9. This switching means may be mounted integral with the regulator itself so that the two together form a unitary device. It comprises an operating member 10 in the form of a shaft carrying at its left-hand end an operating handle or crank 11 and at its intermediate portion movable contacts 12, 13 and 14. At the right-hand end of the operating member 10 is a lock 15 similar to lock 5 and operated by key 6. The arrangement is such that the key 6 can only be inserted in and removed from either of the locks when they are in their locked positions, as shown. The switch 9 has an in-service position in which it is illustrated and an out-of-service position which it assumes when it is rotated 180 degrees. Lock 15 can lock the switch in either of its positions and by reason of the interlocking relationship resulting from the construction of the locks and their operability by only one key the switch can only be moved from one position to the other when the regulator is in its neutral position, as illustrated, and conversely the regulator can only be moved out of its neutral position when the switch is in either its in-service position or its out-of-service position.

With the switch in the in-service position as illustrated, the series winding circuit of the regulator is connected in the upper conductor of the circuit 8 as follows: Through the contact 12, a fixed contact 16 cooperating therewith, a conductor 17, an internal regulator connection 18, the tap-changing means 4, a conductor 19, the contact 13, a cooperating fixed contact 20 and back to the circuit 8. The shunt winding 2 is connected across the circuit through a conductor 21, a fixed contact 22, the movable contact 14, a conductor 23 and back to the upper side of the circuit through conductor 19 and contacts 13 and 20.

If now the tap-changing means 4 is moved upwardly step by step a variable regulating voltage will be inserted in the circuit by reason of the voltage induced in the series winding 3 by the excitation of the common winding 2. This voltage will be either a boosting voltage or a bucking voltage depending upon the position of the switch 7.

For by-passing the series winding circuit there is provided in the switch 9 a fixed contact 24 for cooperation with the movable contact 12. For short circuiting the shunt winding and for grounding both windings when the switch is in its out-of-service position there is provided a pair of fixed contacts 25 and 26 cooperating respectively with the movable contacts 13 and 14. These contacts are connected togeher by a conductor 27 which is then solidly grounded by a conductor 28.

The operation of the switching system when it is desired to take the regulator out of service is as follows: The regulator is first run to its neutral position, it is then locked in this position by the key 6 which, as has previously been explained, can only be removed from the lock 5 when the regulator is locked in its neutral position. The key 6 is then removed and inserted in the lock 15 and the switch 9 unlocked thereby. The handle 11 is then rotated causing the contacts 12, 13 and 14 to rotate in a clockwise direction, as viewed in the drawing. The first result of this rotation will be that the movable contact 12 bridges the contacts 16 and 24 thereby by-passing the series winding circuit. Of course, the series winding is not actually in its circuit at the time because the regulator is a step regulator. However, in induction regulators in which the neural position is one in which the coupling between the windings is substantially zero, the winding itself would be carrying current. However, the series winding circuit of the step regulator includes the internal connection 18 and the tap-changing means 4 and therefore this internal circuit is by-passed by the switch. The continued rotation of the switch causes contact 12 to disengage or to leave the contact 16 and substantially simultaneously the movable contacts 13 and 14 disengage their cooperating fixed contacts 20 and 22. This disconnects both windings of the regulator from the circuit 8. Continued rotation of the switch to its out-of-service position, which position is indicated by dotted lines, brings movable contact 13 into engagement with fixed contact 25 and brings movable contact 14 into engagement with fixed contact 26. The effect of this is to short circuit the shunt winding 2 and ground both windings. The ground connection of the shunt winding 2 is obvious but it will be seen that the series winding is also grounded by its connection to the lower terminal of the shunt winding through the reversing switch 7, the conductor 18 and the tap-changing means 4.

If when the switch 9 is in its out-of-service position it is desired to operate the regulator for testing purposes or for any other reason the switch 9 must first be locked in its out-of-service position before the key 6 can be withdrawn from the lock 15. The key can then be used to unlock the regulator.

In polyphase regulators it will usually be unnecessary to provide the switch 9 with the movable contact 14 and its fixed contacts 22 and 26. This is because in polyphase regulators the phases of the shunt winding are usually star-connected and therefore if the shunt winding 2 of the regulator is considered one of the phases of the shunt winding of a polyphase regulator its upper terminal can be considered as connected to the neutral. Consequently, the grounding of its lower terminal by the engagement of movable contact 13 with fixed contact 25 would result in the short circuiting of the shunt winding and the grounding of its terminals.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating-current circuit, an autotransformer type voltage regulator therefor, and a unitary switch for selectively connecting said regulator to said circuit and disconnecting it therefrom without in either case interrupting said circuit comprising a movable operating member having an in-service position and an out-of-service position, a first set of contacts actuated by said movable member for connecting the series winding of said autotransformer regulator in said circuit when said member is in its in-service position, short circuiting said series winding when said operating member is in an intermediate position and open-circuiting said series winding when said operating member is in its out-of-service position, a second set of contacts actuated by said movable member for connecting the shunt winding of said autotransformer regulator across said circuit when said operating member is in its in-service position, open-circuiting said shunt winding when said operating member is in said intermediate position and short circuiting said shunt winding when said operating member is in said out-of-service position.

2. The combination as set forth in claim 1 in which said regulator has a neutral position, and an interlock between said regulator and said operating member for preventing operation of said operating member except when said regulator is in its neutral position and for preventing operation of said regulator except when said operating member is in either of its extreme positions.

3. The combination as set forth in claim 1 in which the short circuiting connection of said shunt winding is grounded.

4. The combination as set forth in claim 1 in which said second set of contacts grounds said series winding when said operating member is in its out-of-service position.

5. The combination as set forth in claim 1 in which said second set of contacts grounds both said series and shunt windings when said operating member is in said out-of-service position.

6. In combination, an alternating-current circuit, an autotransformer type voltage regulator therefor, and a unitary switch for selectively connecting said regulator to said circuit and disconnecting it therefrom without in either case interrupting said circuit comprising three movable contacts, a common operating member for said movable contacts, said operating member having a pair of extreme positions corresponding respectively to the connected and disconnected conditions of said regulator, three pairs of fixed contacts for co-operation respectively with said movable contacts, a contact of each pair of fixed contacts being engaged by its co-operating movable contact in one of said extreme positions of said operating member and the other contact of each pair of fixed contacts being engaged by its co-operating movable contact in the other of said extreme positions of said operating member, the contacts of one of said pairs of fixed contacts being so correlated to their co-operating movable contact that they are simultaneously engaged thereby in an intermediate position of said operating member, one side of said circuit having a pair of conductors which are connected respectively to said last-mentioned movable contact and to the one of its pair of co-operating fixed contacts which it engages when said operating member is in the extreme position corresponding to the disconnected condition of said regulator, a connection between said last-mentioned fixed contact and the contact of another pair of fixed contacts which is engaged by its co-operating movable contact when said operating member is in the extreme position corresponding to the connected condition of said regulator, the common terminal of the series and shunt windings of said autotransformer regulator being connected to said last-mentioned movable contact, the free terminal of said shunt winding being connected to the remaining movable contact, and a connection between the fixed contacts which are engaged by the two last-mentioned movable contacts when said operating member is in its extreme position corresponding to the disconnected condition of said regulator, the remaining fixed contact of said pair of fixed contacts which is bridged by its co-operating movable contact being connected to the free terminal of the series winding of said autotransformer regulator.

7. The combination as set forth in claim 6 in which the connection between the pair of fixed contacts which are engaged by their co-operating movable contacts when the operating member is in the extreme position corresponding to the disconnected condition of said regulator is grounded.

8. The combination as set forth in claim 6 in which said regulator has a neutral position, and an interlock between said regulator and said operating member for preventing operation of said operating member except when said regulator is in its neutral position and for preventing operation of said regulator except when said operating member is in either of its extreme positions.

THOMAS C. LENNOX.